US008209840B2

(12) United States Patent
Norton

(10) Patent No.: US 8,209,840 B2
(45) Date of Patent: Jul. 3, 2012

(54) ROTATING COUPLING FOR ROBOTIC TOOL CHANGER

(75) Inventor: Daniel Allen Norton, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 1161 days.

(21) Appl. No.: 11/695,212

(22) Filed: Apr. 2, 2007

(65) Prior Publication Data
US 2007/0228671 A1 Oct. 4, 2007

Related U.S. Application Data

(60) Provisional application No. 60/789,004, filed on Apr. 4, 2006.

(51) Int. Cl.
*B23B 31/22* (2006.01)
(52) U.S. Cl. .......... 29/428; 279/2.19; 279/2.23; 279/71; 279/73; 279/134; 403/322.2
(58) Field of Classification Search .................. 29/428; 279/2.19, 2.23, 71, 73, 81, 134, 140; 403/322.2; 439/348; *B23B 31/22*
See application file for complete search history.

(56) References Cited

U.S. PATENT DOCUMENTS

| | | | | |
|---|---|---|---|---|
| 1,406,220 A | * | 2/1922 | Pickett | 279/81 |
| 2,134,199 A | * | 10/1938 | Newton et al. | 220/86.4 |
| 2,408,689 A | * | 10/1946 | Seme | 33/573 |
| 2,470,256 A | * | 5/1949 | McIlroy | 285/277 |
| 3,822,951 A | * | 7/1974 | Bornzin | 403/316 |
| 4,231,581 A | * | 11/1980 | Benedict | 279/19.4 |
| 4,652,187 A | * | 3/1987 | Regelsberger et al. | 408/240 |
| 4,696,524 A | | 9/1987 | Cloyd | |
| 4,708,548 A | * | 11/1987 | Taylor et al. | 409/234 |
| 4,775,269 A | * | 10/1988 | Brix | 408/239 R |
| 5,211,501 A | | 5/1993 | Nakamura et al. | |
| 7,252,453 B1 | * | 8/2007 | Little | 403/322.2 |
| 2007/0235949 A1 | * | 10/2007 | Gloden et al. | 279/2.12 |

OTHER PUBLICATIONS

Little, Robert. "Robot Arm Coupling Apparatus." Filed May 29, 2002, 19 pages, U.S. Appl. No. 10/157,581.
Gloden, Michael et. al. "Robotic Tool Changer." Filed Mar. 14, 2006, 27 pages, U.S. Appl. No. 11/374,706.

* cited by examiner

Primary Examiner — Eric A Gates
(74) Attorney, Agent, or Firm — Coats & Bennett, P.L.L.C.

(57) ABSTRACT

In a robotic tool coupler, a rotating cam member having a plurality of surfaces formed therein urges a plurality of ball members in one tool coupling unit radially to contact an angled surface in the other tool coupling unit. Further rotation of the cam member exerts a radial force through the ball members onto the angled surface. A component of that force is directed by the angled surface toward the opposite tool coupling unit, locking the two units together. The cam member may include a failsafe surface and/or a failsafe lobe to maintain the two units locked together in the event of a loss of power to positively actuate the cam member.

11 Claims, 6 Drawing Sheets

ROTATING COUPLING FOR ROBOTIC TOOL CHANGER

This application claims priority to Provisional U.S. Patent Application 60/789,004 filed Apr. 4, 2006, entitled, "Rotating Coupling for Robotic Tool Changer" which is incorporated herein by reference in its entirety.

BACKGROUND

The present invention relates generally to the field of robotics and in particular to a rotating coupling for a robotic tool changer.

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, the considerable cost of an industrial robot is amortized over a variety of tasks by providing different tools, or end effectors, that may be coupled to a general-purpose robotic arm. For example, in an automotive manufacturing application, a robot may be utilized to cut, grind, or otherwise shape metal parts during one production run, and perform a variety of spot welding tasks in another. Different welding tool geometries may be advantageously mated to a particular robot to perform welding tasks at different locations or in different orientations. In these applications, a tool changer is used to mate different tools to the robot.

One half of the tool changer, called the master module, is permanently affixed to a robot arm. The other half, called the tool module, is affixed to each tool that the robot may utilize. Utilities such as electrical current, air pressure, hydraulic fluid, cooling water, and the like, are fed through cables and plumbing down the robot arm, that terminate at the master module. Similar cables and plumbing carry the utilities from the tool module to the particular tool. When the tool changer halves are mated, the utilities are transferred across the changer and made available at the tool. A tool changer thus provides a standard mechanical interface for physically coupling a variety of tools to a robotic arm, as well as providing for the transfer of utilities. Utility and safety concerns dictate that the physical coupling between master and tool modules of a robotic tool changer be robust and secure, even in the face of a power outage or loss of a utility such as pneumatic pressure.

The use of rolling members, urged by a piston against an inclined surface, to lock the master and tool modules together is known in the art. For example, U.S. Pat. No. 4,696,524 (incorporated herein by reference) discloses a plurality of ball members contained within the master module, and circumferentially arranged around a central axis. Extending from the master module, along this axis, is a piston member having an inclined surface operative to contact the ball members and urge them outwardly as the piston advances axially. The ball members contact a surface in the tool module disposed at an angle such that outward force induced on the ball members by the piston generates an "upward" force component that presses the angled surface, and thus the entire tool module, against the master module.

U.S. Pat. No. 5,211,501 (incorporated herein by reference) discloses a similar piston and ball member arrangement, with an improved piston/ball member contact surface. This patent discloses a multifaceted contact surface comprising an initial tapered contact surface for first contacting the ball members and moving them outward and into contact with an angled surface of the tool module. A flat—i.e., parallel with the piston axis—failsafe surface is adjacent the initial tapered surface. A tapered locking surface, at an angle with respect to the axis of less than that of the initial actuating surface, is adjacent the failsafe surface.

For the following discussion, assume the master module is oriented over the tool module, with the interface plane between the two modules parallel with the horizon. As the piston member advances axially (downwardly) into the tool module, the initial contact surface contacts the ball members and moves them radially outward (horizontally) into the tool module. At the extent of the piston's axial movement, the final tapered surface presses each ball member outwardly against an angled surface in the tool module. This angled surface tapers inwardly, toward the piston axis, as it approaches the master module. Each ball member, urged outwardly by the tapered locking surface of the piston member, presses against the tool module angled surface with a resultant force that can be decomposed into horizontal (outward) and vertical (upward) components. The vertical component of force presses the tool module upward and locks the tool module to the master module.

The ball members press inwardly against the piston with equal and opposite force. Since the tapered locking surface is angled with respect to the piston axis, the force exerted by each ball member is a resultant force that can also be decomposed into horizontal (inward) and vertical (upward) components. In the event of a loss of force actuating the piston, the vertical component of force exerted by the ball members urges the piston upwardly. As the piston moves upwardly, the balls are free to move inwardly, pressing with less force on the tool module angled surface and tending to decouple the master and tool modules. For safety, a failsafe surface is interposed between the piston initial contact surface and the tapered locking surface, both of which are tapered. The failsafe surface is vertical—i.e., parallel with the piston axis. During a power loss, force exerted by the ball members may move the piston slightly upwards, until the ball members contact the failsafe surface. Since the failsafe surface is vertical, the resultant force exerted by the ball members is normal, i.e., horizontal, and includes no vertical component. This prevents force from the balls on the piston from further retracting the piston into the master module and further decoupling the modules, without some positive actuation of the piston in that direction. Accordingly, the tool module remains coupled to the master module when piston actuating power is lost.

Pending patent application Ser. No. 10/157,581 (incorporated herein by reference) discloses a similar piston and ball member arrangement, with a piston member contact surface having a tapered locking surface at an angle with respect to the axis greater than that of the initial actuating surface.

Pending patent application Ser. No. 11/374,706 (incorporated herein by reference) discloses a similar piston and ball member arrangement, with a piston member contact surface having a failsafe surface that includes a lip, or protrusion, which actively opposes retracting motion of the piston. When the master and tool modules are coupled together—that is, when the ball members are fully extended by the tapered locking surface and pressing against the tool module angled surface—the protrusion on the failsafe surface is past (below) the ball members. In the event of loss of piston actuating power, the force exerted by the ball members on the tapered locking surface tends to decouple the master and tool modules, as described above. This tendency is neutralized by the failsafe surface being parallel to the piston axis, thus not supporting any component of force in the axial direction. The protrusion provides an additional assurance that the piston cannot retract into the master module. Moving the protrusion past the ball members requires a positive retracting force on the piston, since the balls must momentarily be pressed yet further against the tool module angled surface for the protrusion to pass. The protrusion may comprise a raised surface, or the lip of a depression in the failsafe surface into which the ball members nestle.

Pending provisional patent application Ser. No. 60/789, 004 (incorporated herein by reference), discloses a variety of similar piston and ball member arrangements, wherein the piston is actuated between retracted and extended positions by electrical power and a various power transmission systems and gear trains.

In all of the above examples, the ball members are moved outwardly against the tool module's angled surface by axial motion of a piston. This requires sufficient room in the master tool module above the piston to house the piston in the retracted position. If the ball members could be actuated outwardly and forced against the tool module angled surface without requiring axial motion of a piston, the master tool module may be designed with a more compact, lower profile shape.

SUMMARY

According to one or more embodiments disclosed and claimed herein, a rotating cam member having a plurality of surfaces formed therein urges a plurality of ball members in one tool coupling unit radially to contact an angled surface in the other tool coupling unit. Further rotation of the cam member exerts a radial force through the ball members onto the angled surface. A component of that force is directed by the angled surface toward the opposite tool coupling unit, locking the two units together.

One embodiment relates to a robotic tool changer. The tool changer includes a first unit operative to be attached to one of a robot and a robotic tool. The tool changer also includes a second unit operative to be attached to the other of the robot and a robotic tool, and further operative to be selectively coupled to and decoupled from the first unit. A plurality of ball members is disposed in the first unit. A cam member is disposed in one of the units and is operative to engage the ball members in the first unit and to urge the ball members, by rotational movement of the cam member, against an angled surface of the second unit to lock the first and second units together.

Another embodiment relates to a tool changer. The tool changer includes a tool unit operative to attach to a robotic tool and including a generally circular chamber. The tool changer also includes a master unit operative to attach to a robot, and to selectively couple to and decouple from the tool unit. An annular collar on the master unit has a plurality of holes formed therethrough. A plurality of ball members is disposed within the holes. A rotating cam member is disposed within the annular collar in the master unit, and is operative to urge the ball members radially outward of the collar as the cam member rotates. An angled surface in the tool unit chamber, opposite each collar hole when the master and tool units are abutted, is operative to direct a component of the force applied to it by the ball members towards the master unit.

Yet another embodiment relates to a method of selectively coupling two robotic tool coupler units. The two units are abutted, and a cam member in one unit is rotated. a plurality of ball members disposed in one unit are urged toward an angled surface in the other unit by the rotating cam member. After the ball members contact the angled surface, a force is applied by the rotating cam member through the ball members to the angled surface; a component of the force on the angled surface is directed toward the other tool coupler unit and is operative to lock the two units together.

DETAILED DESCRIPTION

According to one or more embodiments of the present invention, a rotating coupling mechanism couples the master and tool modules of a robotic tool changer together, obviating the need for a piston that moves axially to achieve the coupling.

Figure 1:
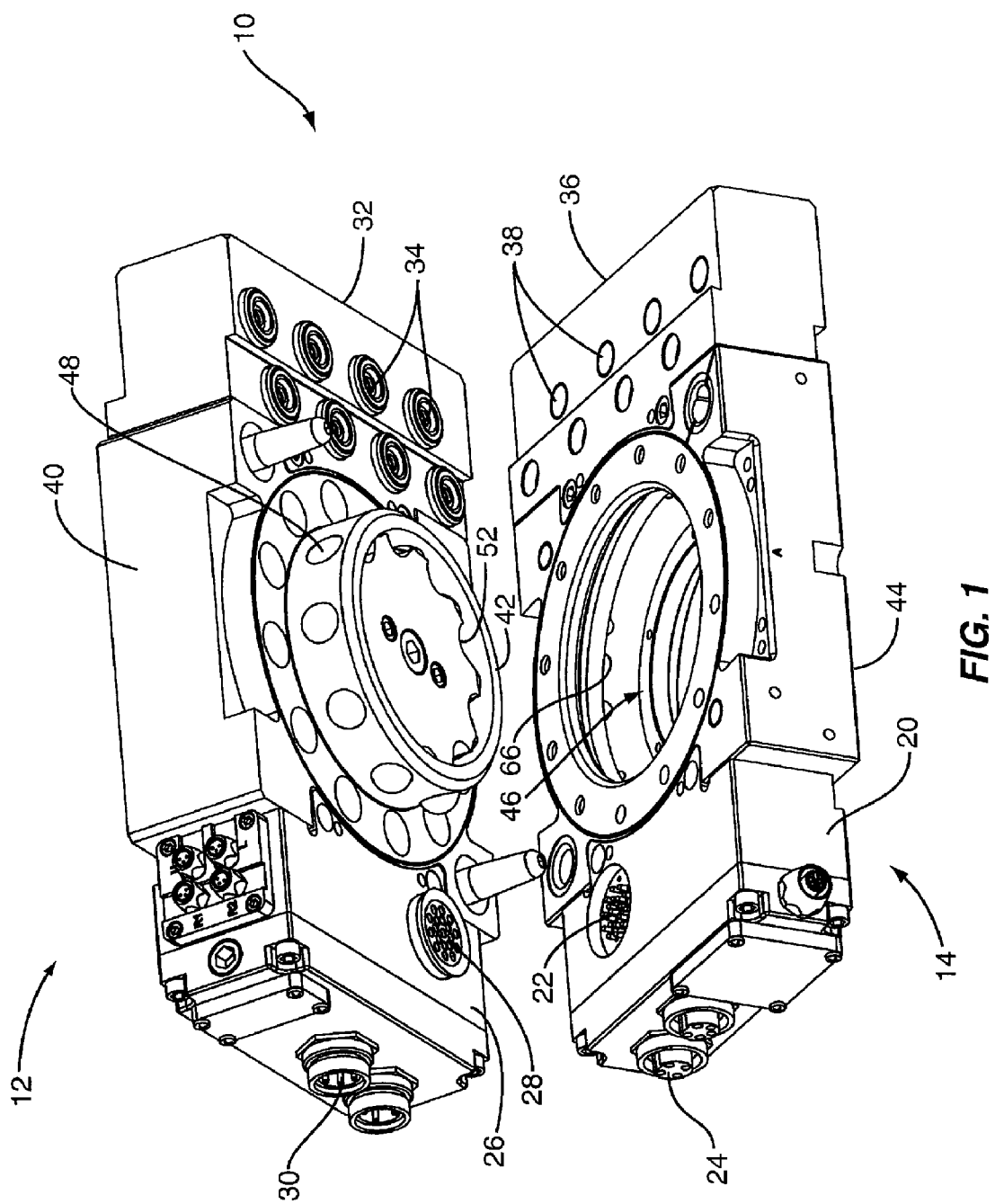
FIG. 1 is a perspective rendering of a robotic tool changer with electrical signal and pneumatic fluid utility modules attached.

FIG. 1 depicts a robotic tool changer, indicated generally by the numeral 10. The robotic tool changer 10 comprises a master module 12 adapted to be connected to a robotic arm (not shown) and a tool module 14, adapted to be connected to a robotic tool (not shown). The robotic tool changer 10 allows users to selectively attach different tools to a robotic arm by selectively coupling and decoupling the master module 12 and the tool module 14. Alignment pins 16 on the master module 12 mate with alignment holes 18 on the tool module 14, to ensure proper alignment of the master and tool modules 12, 14 when the units are coupled together.

In various embodiments, the tool changer 10 may provide for the passing of various utilities, such as electrical power, pneumatic gas, fluids, data signals, and the like, between a robotic arm and a robotic tool. For example, FIG. 1 depicts a tool electrical signal module 20 affixed to the tool module 14. The tool electrical signal module 20 includes male electrical contacts 22, connected internally to one or more connectors 24. A master electrical signal module 26 is affixed to the master module 12. The master electrical signal module 26 includes female electrical contacts 28 adapted and disposed to mate with the male electrical contacts 22 when the master and tool modules 12, 14 are coupled together. The female electrical contacts 28 are connected internally to one or more connectors 30. Electrical signals may flow, for example, from the robot arm into contacts 30, from female electrical contacts 28 to male electrical contacts 22 when the master and tool modules 12, 14 are coupled together, and thence from connector 24 to an attached tool. Signals in the opposite direction may follow a reverse path.

The tool changer 10 additionally includes a master pneumatic module 32 affixed to the master module 12. The master pneumatic module 32 has self-sealing pneumatic ports 34, each in communication with respective external pneumatic ports (not shown), A tool pneumatic module 36 is affixed to the tool module 14. The tool pneumatic module 36 has pneumatic ports 38 adapted and disposed to seal against pneumatic ports 34 when the master and tool modules 12, 14 are coupled together. The tool pneumatic ports 38 are connected to respective external pneumatic ports (not shown), The master and tool pneumatic modules 32, 36 allow for the passage of pressurized pneumatic fluid from a robotic arm to a robotic tool. In general, the tool changer 10 may include none, one, or a variety of utility passing modules such as electrical signal modules 20, 26, pneumatic modules 32, 36, or other utility passing modules, as known in the art.

The master tool module 12 includes a housing 40 and an annular collar 42 protruding therefrom and extending beyond the plane of the face of the housing 40 facing the tool module 14 when the master and tool modules 12, 14 are coupled together. The tool module 14 includes a housing 44, with a circular chamber 46 formed therein, the face of the housing 44 facing the master module 12 when the master and tool modules 12, 14 are coupled together. As depicted in the sectional view of FIG. 2, the collar 42 extends into the chamber 46 when the master and tool modules 12, 14 are abutting, including when they are coupled together.

Figure 2:
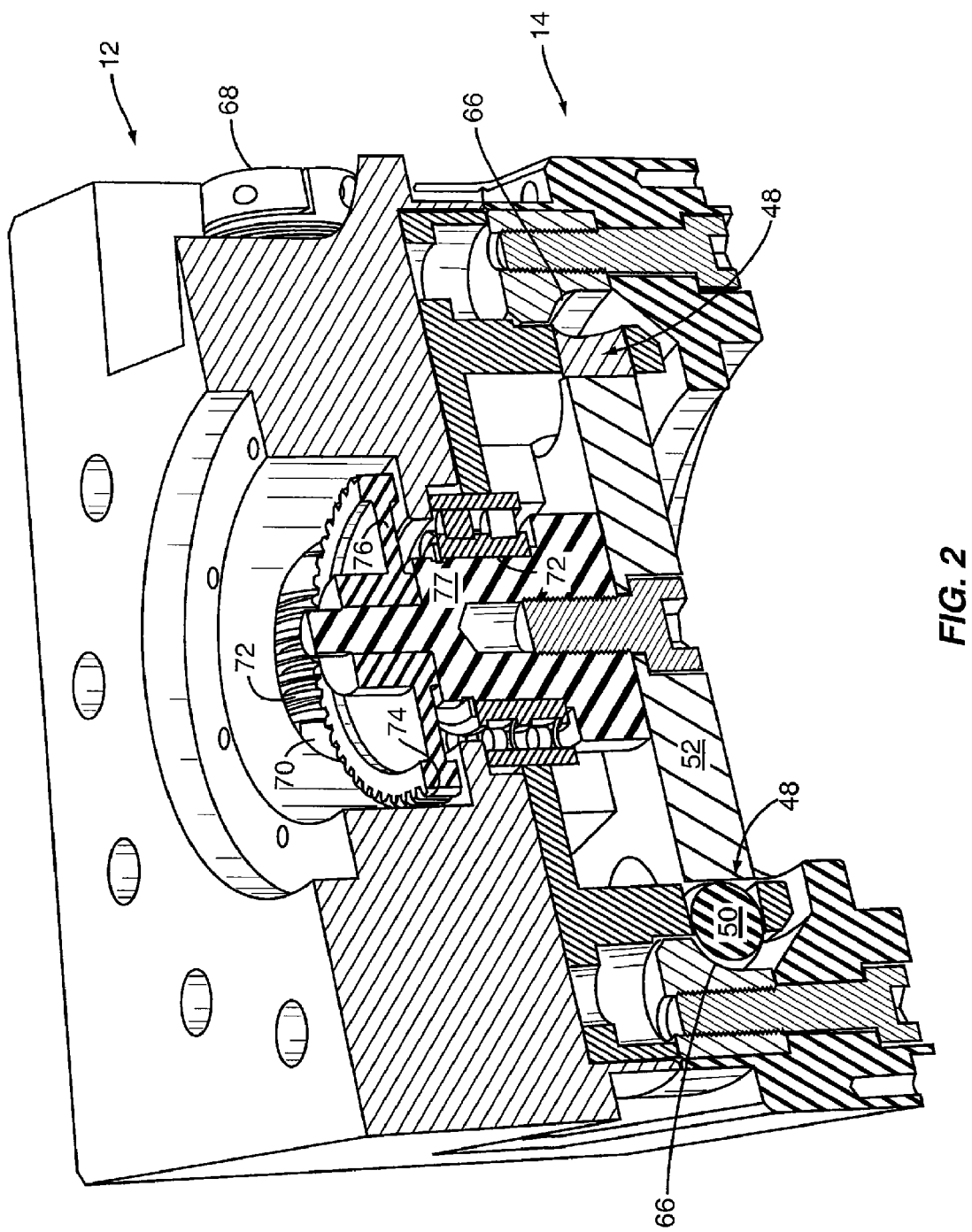
FIG. 2 is a sectional view of the robotic tool changer of FIG. 1.

A plurality of holes 48 are formed in the collar 42 and extending therethrough, the holes 48 having generally even radial spacing around the circumference of the collar 42. As best seen in FIG. 2, the holes 48 are tapered, having a slightly larger diameter at the inner surface of the collar 42 than at the outer surface of the collar 42. Disposed in each hole 48 is a ball member 50. The ball members 50 are retained within the collar 42 by each tapered hole 48 having a diameter at the exterior surface of the collar 42 that is slightly less than the diameter of the corresponding ball member 50. Accordingly, the ball members 50 may move between a retracted position wherein the outermost surface of each ball member 50 is flush with or interior to the outer surface of the collar 42, and an extended position wherein each ball member 50 extends past the outer surface of the collar 42 by an amount slightly less than the radius of the ball member 50.

Figure 3:
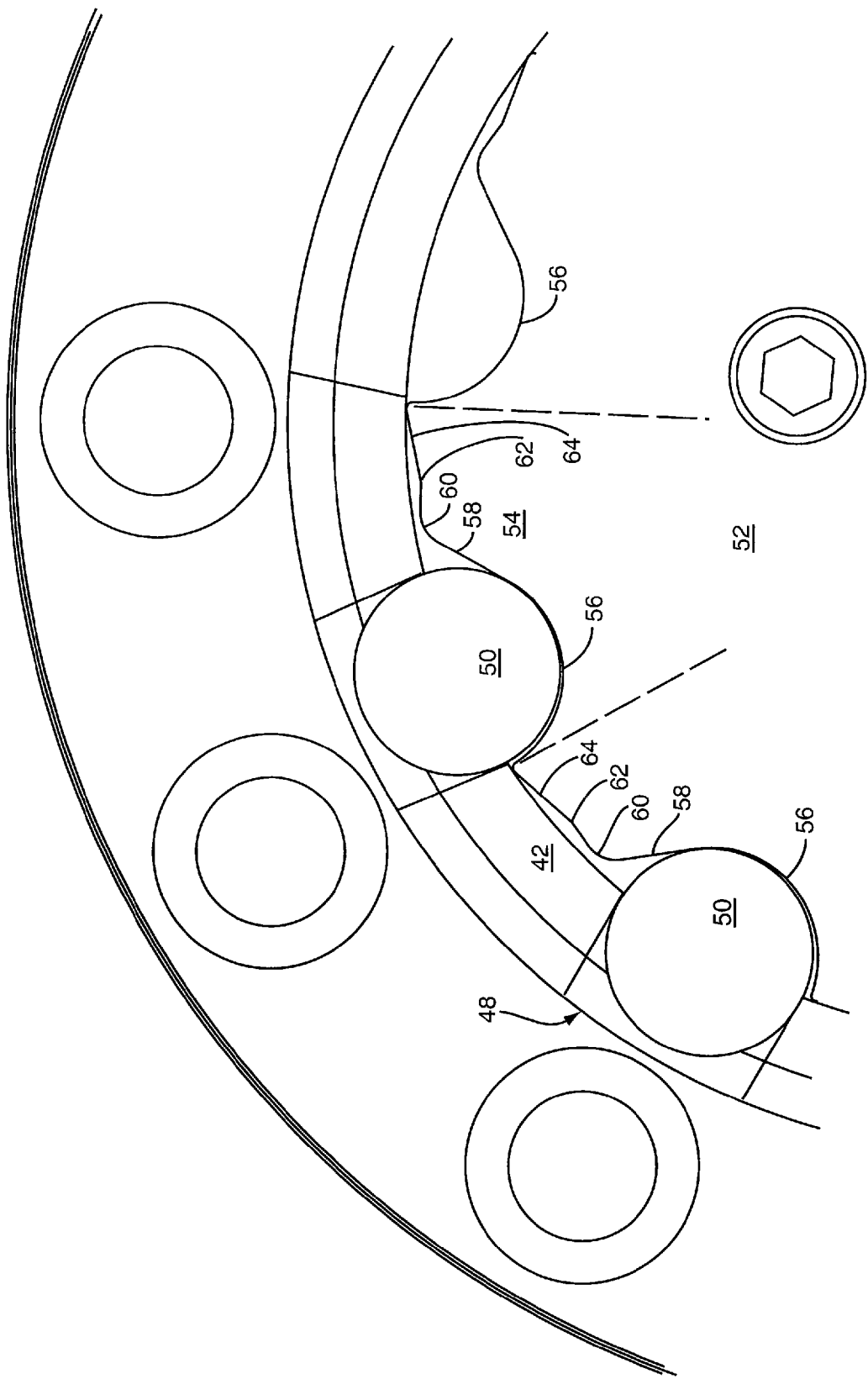
FIG. 3 is a partial sectional view depicting a ball member in a retracted position.

A rotating cam member 52 is disposed within the interior space defined by the collar 42. The rotating cam member 52 includes a plurality of teeth 54, with the number of teeth 54 corresponding to the number of ball members 50. As best depicted in FIG. 3, each tooth 54 comprises a plurality of cam surfaces that actuate a ball member 50 between the retracted and extended positions thereof as the rotating cam member 52 rotates about its axis. Each tooth includes a nesting surface 56, an actuating surface 58, a failsafe lobe 60, a failsafe surface 62, and a locking surface 64.

FIG. 3 depicts a partial sectional view showing two ball members 50, each contacting the nesting surface 56. The ball members 50 are in a fully retracted position, with no portion of either ball member 50 surface protruding past the outer surface of the collar 42. This is the uncoupled position, in which the master and tool modules 12, 14, may be separated.

As the rotating cam member 52 rotates in a counter-clockwise position (as depicted in FIGS. 3-6), each actuating surface 58 displaces the corresponding ball member 50 outwardly through its hole 48. Assuming the master and tool modules 12, 14 are abutting, with the collar 42 disposed within the chamber 46, as the ball members 50 move outwardly, each will come into contact with an angled surface 66 in the tool module 14, as best seen in FIG. 2. As the cam surfaces 58-64 of the tooth 54 press the ball member 50 outwardly, the resultant force exerted on the angled surface 66 may be decomposed into two vector components: a force directed outwardly in the direction of the movement of the ball member 50, and a force directed upwardly (as depicted in FIG. 2), in the direction of the master module 12. This second force locks the tool module 14 to the master module 12.

Figure 4:
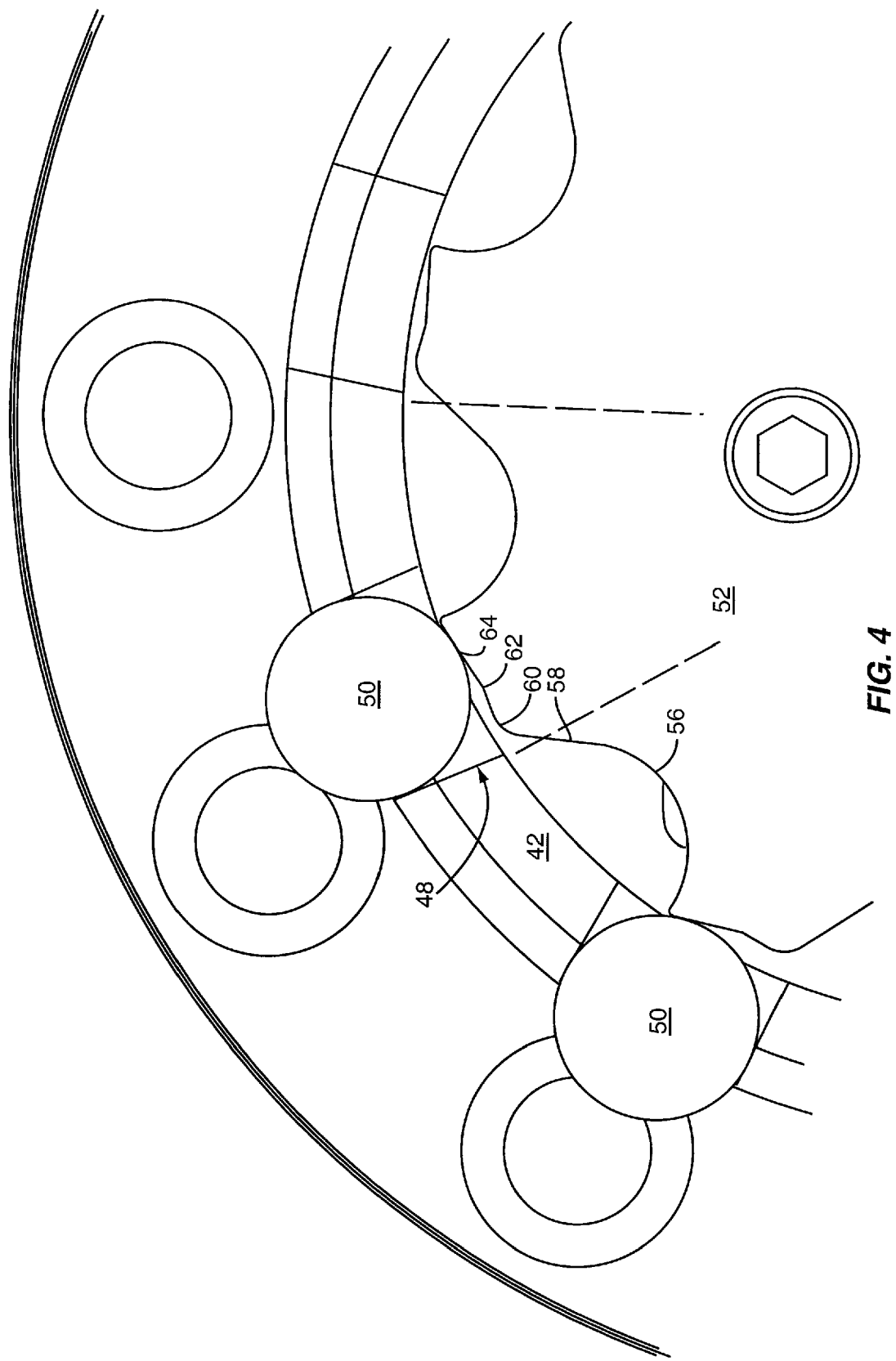
FIG. 4 is a partial sectional view depicting a ball member in an extended position.

The rotating cam member 52 continues its rotation in a counter-clockwise direction (as depicted in FIGS. 3-6) until each locking surface 64 presses a corresponding ball member 54, as depicted in FIG. 4. The locking surface 64 presses the ball member 50 tightly against the angled surface 66 of the tool module 14. Note that the locking surface 64 extends furthest outward of any surface 56-64 of the tooth 52, thus pressing the ball member against the angled surface 66 with the maximum force. The rotating cam member 52 assumes and maintains the position depicted in FIG. 4 when the master and tool modules 12, 14 are coupled together.

Safety is always a major concern in robotics. In the event of a loss of electrical, pneumatic, hydraulic, or other form of power driving the rotating cam member 52 to maintain the position depicted in FIG. 4, the force of the ball member 50 pressing on the locking surface 64 may urge the rotating cam member 52 in a clockwise direction (as depicted in FIGS. 3-6). If the rotating cam were to rotate in this direction to the position depicted in FIG. 3, the ball members may completely disengage the angled surface 66 in the tool module 14, allowing the tool module 14 to decouple from the master module 12, with potentially disastrous results.

Figure 5:
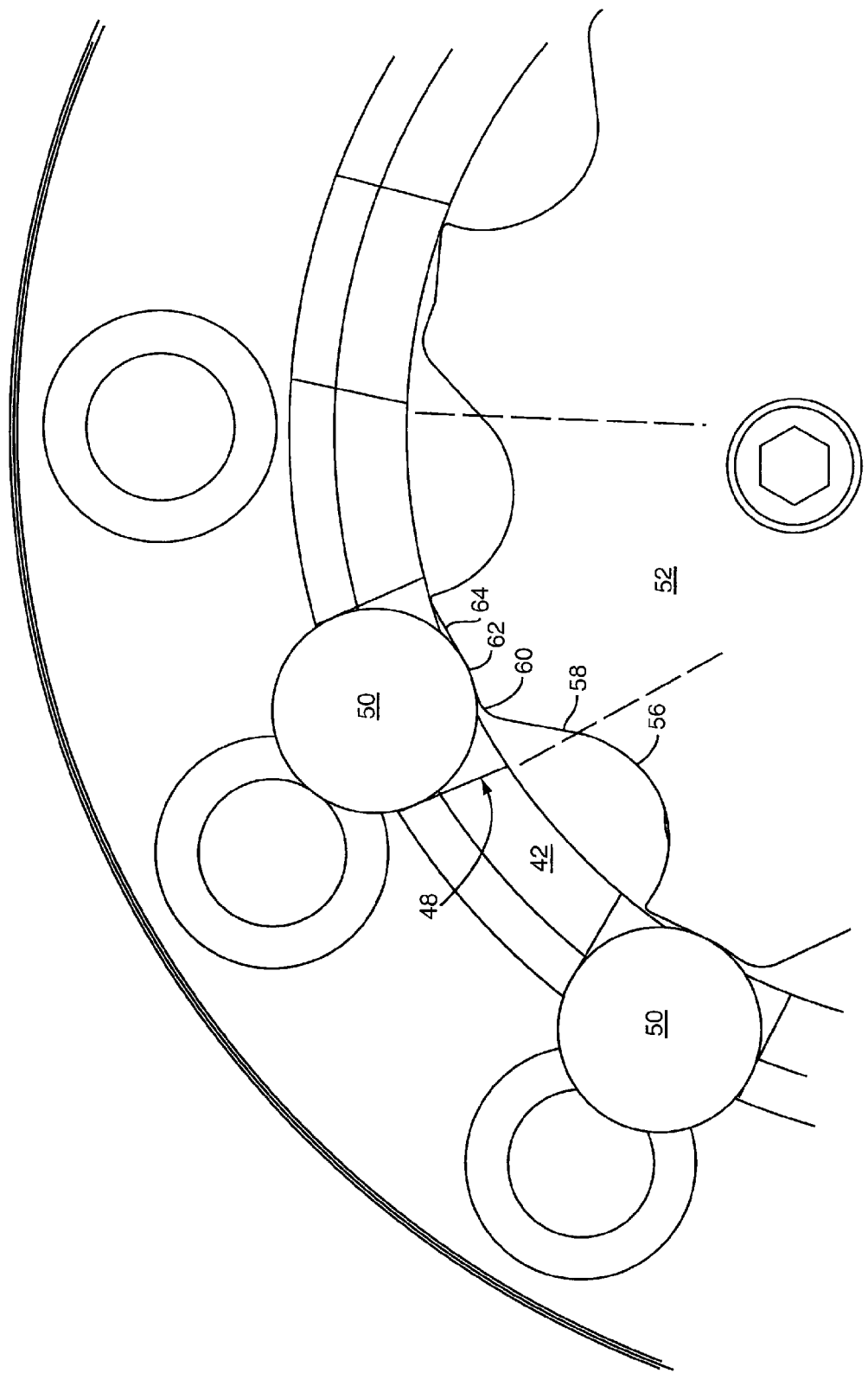
FIG. 5 is a partial sectional view depicting a ball member in a failsafe position.

To prevent this possibility, each tooth 54 of the rotating cam member 52 includes a failsafe surface 62 and optionally a failsafe lobe 60. FIG. 5 depicts a master module 12 having experienced a power loss, and wherein the ball member 50 has urged the rotating cam member 52 slightly in a clockwise direction. As best seen in FIG. 3, the failsafe surface 62 includes a slight recess or ball retention chamber, formed by intersecting slopes from the failsafe lobe 60 and the locking surface 64. This recess tends to cradle the ball member 50. In this position (FIG. 5), the ball member 50 presses inwardly toward the center of the rotating cam member 52; however, this force does not induce any torque on the rotating cam member 52 since it presses equally on the failsafe lobe 60 and the locking surface 64 slopes. This prevents the rotating cam member 52 from further clockwise rotation, maintaining a safe, locked state between the master and tool modules 12, 14.

In one embodiment (not shown), the failsafe surface 62 may simply comprise a flat surface, tangential to the surface of the rotating cam member 52 from the base of the slope of the locking surface 64 to the beginning of the slope of the actuating surface 58. The resultant force exerted on the ball members 50 by the angled surface 66 is directed inwardly and toward the tool module 14 (i.e., downwardly, as depicted in FIG. 2). Only the inwardly directed component of this force is exerted by the ball members 50 on the rotating cam member 52. The downwardly directed component of force is absorbed by the wall of the hole 48. Accordingly, the ball member 50 does not exert any component of force in a "side," or tangential direction that can induce a torque on, or rotation of, the rotating cam member 52 in a clockwise, or unlocking, direction. Hence a tangentially flat failsafe surface 62, normal to the force exerted by the ball member 50, is sufficient to ensure that the ball members 50 cannot urge the locking cam member 52 to a decoupling position (FIG. 3) in the event of a power loss.

However, many parasitic forces are present in robotic environments, including vibration, inertial forces induced by movement of the robotic arm, and the like. To provide an even more effective failsafe design that can withstand the effect of such parasitic forces, the embodiment of the rotating cam member 52 depicted in FIGS. 3-6 includes a failsafe lobe 60 that not only disallows the ball members 50 to urge the rotating cam member 52 to a decoupled position (FIG. 3), but requires the active application of a non-trivial amount of torque to the rotating cam member 52 to reach the decoupled position.

Figure 6:
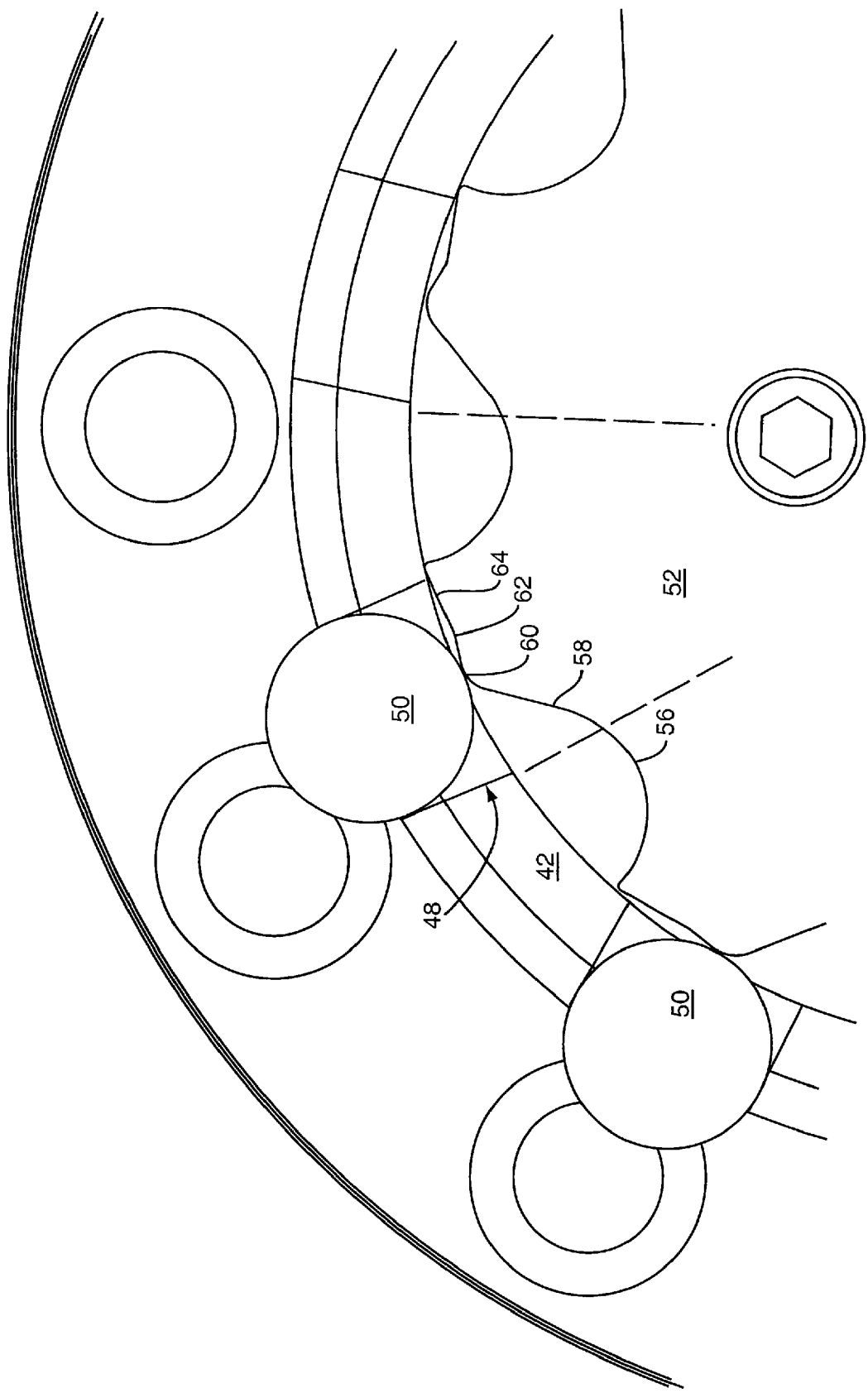
FIG. 6 is a partial sectional view depicting a ball member clearing a failsafe lobe in moving between failsafe and retracted positions.

As best seen in FIG. 6, in moving from the coupled to decoupled position, the ball members 50 are allowed to recess slightly as the point of contact moves from the locking surface 64 to the failsafe surface 62. The ball members 50 must then be forced back out into a more extended position to clear the failsafe lobe 60, as depicted in FIG. 6. The torque required to rotate the rotating cam member 52 from the position depicted in FIG. 5 to that depicted in FIG. 6 exceeds any force that may be induced on the rotating cam member 52 by parasitic forces.

The rotating cam member 52 may be driven in a wide variety of ways. In the embodiment depicted in FIG. 2, an electric motor 68 drives a shaft 70, on which are formed worm threads 72. The worm threads 72 engage teeth 74 of a worm gear 76 rigidly attached to the rotating cam member 52 by a shaft 77. Centering the shaft 77 in the tool changer 10 and allowing free rotation thereof is a bearing 78. By selective application of electricity to the motor 68, the rotating cam member 52 may be driven in either direction, to couple the master and tool modules 12, 14 together, and to uncouple them. One inherent advantage of the worm gear drive train depicted in FIG. 2 is that it resists back-force. That is, even in the event of loss of power to the motor 68, the clockwise torque induced on the rotating cam member 52 by ball members 50 pressing against locking surfaces 64 (FIG. 4) may not effect a clockwise rotation of the rotating cam member 52 due to inertial forces in the worm gear drive train, further enhancing system safety. The motor 68 and drive train 70, 72, 76, 77 are not, of course, the only way to drive the rotating cam member 52, and the present invention is not limited to this embodiment. In general, the rotating cam member 52 may be selectively rotated to couple and decouple the master and tool modules 12, 14 in any manner known in the art, including by electric motor or solenoid, via hydraulic or pneumatic actuation, manually, or the like.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. For example, the ball members 50 and/or cam member 52 may be disposed in the tool unit 44, and the angled surface 66 may be disposed in the master unit 40. Furthermore, the cam member 52 may urge the ball members 50 inwardly rather than outwardly. In general, a wide variety of variations may be devised by those of skill in the art, given the teachings of the present disclosure. The present embodiments are therefore to be construed in all aspects as illustrative and not restrictive and all changes coming within the meaning and equivalency range of the appended claims are intended to be embraced therein.

What is claimed is:

1. A robotic tool changer, comprising:
a first unit operative to be attached to one of a robot and a robotic tool;
a second unit operative to be attached to the other of the robot and a robotic tool, and further operative to be selectively coupled to and decoupled from the first unit;
a plurality of ball members disposed circumferentially about an axis in the first unit;
an angled surface in the second unit; and
a cam member disposed in one of the units inwardly of the ball members and rotatable between decoupled and coupled positions, the cam member comprising a plurality of teeth, each tooth associated with a ball member and comprising a plurality of surfaces, wherein the cam member is operative to engage the ball members in the first unit and to urge the ball members radially outwardly from the axis and against the angled surface to lock the first and second units together when the cam member is rotated to the coupled position, wherein the plurality of surfaces includes a nesting surface operative to contact a ball member in a fully retracted position wherein the ball member does not contact the second unit, an actuating surface operative to displace a ball member towards contact with the angled surface of the second unit as the cam member rotates toward the coupled position, a locking surface operative to press a ball member against the angled surface of the second unit, locking the first and second units together, when the cam member is rotated to the coupled position, and a failsafe surface interposed between the locking surface and the actuating surface, the failsafe surface contacting a ball member at a normal angle to the direction of motion of the ball member as the cam member is rotated between decoupled and coupled positions.

2. The tool changer of claim 1 wherein the plurality of surfaces includes a failsafe lobe interposed between the locking surface and the actuating surface, the failsafe lobe forming a ball member retention channel with the locking surface operative to retain the ball member between the locking surface and the failsafe lobe in the absence of rotational force applied to the cam member.

3. The tool changer of claim 1 wherein the cam member and the ball members are disposed in the first unit.

4. The tool changer of claim 3 wherein the ball members are disposed in a plurality of holes in a collar of the first unit that is disposed within an annular chamber in the second unit when the units are to be coupled together, and wherein rotating the cam member from the uncoupled to the coupled position moves the ball members from retracted positions within the holes to extended positions wherein the ball members are disposed partially outward of the collar and in contact with the angled surface of the second unit.

5. The tool changer of claim 4 wherein the holes in the collar of the first unit have a diameter at the interior of the collar greater than the diameter of the ball members, and a diameter at the exterior of the collar less than the diameter of the ball members, thereby retaining the ball members in the holes when the first and second unit are decoupled.

6. A robotic tool changer, comprising:
a first unit operative to be attached to one of a robot and a robotic tool;
a second unit operative to be attached to the other of the robot and a robotic tool, and further operative to be selectively coupled to and decoupled from the first unit;
a plurality of ball members disposed circumferentially about an axis in the first unit;
an angled surface in the second unit; and
a cam member disposed in one of the units inwardly of the ball members and rotatable between decoupled and coupled positions, wherein the cam member is operative to engage the ball members in the first unit and to urge the ball members radially outwardly from the axis and against the angled surface to lock the first and second units together when the cam member is rotated to the coupled position; and
wherein the unit housing the cam member further comprises an electric motor operative to selectively rotationally drive the cam member between decoupled and coupled positions.

7. The tool changer of claim 6 wherein the unit housing the cam member further comprises a drive train including a worm gear between the motor and the cam member.

8. A tool changer, comprising:
- a tool unit operative to attach to a robotic tool and including a generally circular chamber;
- a master unit operative to attach to a robot, and to selectively couple to and decouple from the tool unit;
- an annular collar on the master unit, having a plurality of holes formed therethrough;
- a plurality of ball members disposed within the holes;
- a rotating cam member disposed within the annular collar in the master unit, the cam member operative to urge the ball members radially outward of the collar as the cam member rotates from an uncoupled to a coupled position; and
- an angled surface in the tool unit chamber opposite each collar hole when the master and tool units are abutted, the angled surface operative to direct a component of the force applied to it by the ball members towards the master unit;
- wherein the rotating cam member comprises a plurality of teeth, each tooth including
  - a nesting surface operative to contact a ball in a fully retracted position wherein the ball does not extend outward of the annular collar;
  - an actuating surface operative to displace a ball towards contact with the angled surface of the tool unit as the cam member rotates;
  - a locking surface operative to press a ball against the angled surface of the second unit when the cam member rotates to the coupled position; and
  - a failsafe surface interposed between the locking surface and the actuating surface, the failsafe surface contacting a ball at a normal angle to the direction of motion of the ball as the cam member rotates between the uncoupled and coupled positions.

9. The tool changer of claim 8 wherein each cam member tooth further includes a failsafe lobe interposed between the locking surface and the actuating surface, the failsafe lobe forming a ball retention channel with the locking surface operative to retain the ball between the locking surface and the failsafe lobe in the absence of rotational force applied to the cam member.

10. A method of selectively coupling two robotic tool coupler units, comprising:
- abutting the two units;
- rotating a cam member in one unit from an uncoupled to a coupled position;
- urging a plurality of ball members disposed in one unit radially outwardly from a central axis toward an angled surface in the other unit by the rotating cam member;
- after the ball members contact the angled surface as the cam member is rotated to the coupled position, applying a force directed radially outwardly from the central axis by the rotating cam member through the ball members to the angled surface, a component of the force on the angled surface directed toward the other tool coupler unit and operative to lock the two units together; and
- in the event of loss of power to rotate the cam member, maintaining the rotary position of the cam member by eliminating any component of force exerted by the ball members on the cam member in a direction of rotation toward the uncoupled position.

11. The method of claim 10 further comprising presenting a resistance to turning the cam member in a direction of rotation toward the uncoupled position, such that in the event of loss of power to rotate the cam member, the two units remain coupled together.

* * * * *